Patented Nov. 15, 1927.

1,649,536

UNITED STATES PATENT OFFICE.

RUDOLF LIESKE AND WILHELM BONRATH, OF LEVERKUSEN, NEAR COLOGNE, GERMANY, ASSIGNORS, BY MESNE ASSIGNMENTS, TO WINTHROP CHEMICAL COMPANY, INC., OF NEW YORK, N. Y., A CORPORATION OF NEW YORK.

COPPER DERIVATIVE FOR COMBATING ANIMAL AND PLANT PESTS.

No Drawing. Application filed March 23, 1925, Serial No. 17,817, and in Germany April 10, 1924.

The present invention concerns the use of copper derivatives for combating animal and plant pests in particular parasitic diseases. The products of interaction of copper compounds with aromatic bases, as for instance aniline or its homologues are very efficient materials against animal and plant parasites.

For example the precipitate from an aqueous solution of copper sulfate and aniline is a very effective means for combating these pests. Such a product can be easily obtained in the following manner: treating an aqueous solution of copper sulfate with aniline until no further precipitation occurs. It is a greenish precipitate.

We claim:—

1. A germicidal, fungicidal or insecticidal composition comprising the products obtainable by the interaction of a copper compound with an aromatic base of the benzene series.

2. A germicidal, fungicidal or insecticidal composition comprising the product obtainable by the interaction of copper sulfate with aniline.

In testimony whereof we have hereunto set our hands.

RUDOLF LIESKE.
WILHELM BONRATH.